United States Patent
Yamamoto et al.

(10) Patent No.: US 9,392,138 B2
(45) Date of Patent: Jul. 12, 2016

(54) IMAGE FORMING APPARATUS AND PROGRAM THEREOF

(71) Applicants: Mitsufumi Yamamoto, Tokyo (JP); Natsuko Ishizuka, Kanagawa (JP)

(72) Inventors: Mitsufumi Yamamoto, Tokyo (JP); Natsuko Ishizuka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/615,521

(22) Filed: Feb. 6, 2015

(65) Prior Publication Data

US 2015/0244894 A1    Aug. 27, 2015

(30) Foreign Application Priority Data

Feb. 26, 2014  (JP) .................. 2014-035908

(51) Int. Cl.
*H04N 1/04* (2006.01)
*H04N 1/12* (2006.01)
*H04N 1/48* (2006.01)

(52) U.S. Cl.
CPC . *H04N 1/121* (2013.01); *H04N 1/48* (2013.01)

(58) Field of Classification Search
CPC ................................. H04N 1/121; H04N 1/48
USPC .................... 358/1.9, 1.15, 474, 498
See application file for complete search history.

(56) References Cited

U.S. PATENT DOCUMENTS

| | | | |
|---|---|---|---|
| 5,529,298 A * | 6/1996 | Gough | B43M 3/04 270/56 |
| 5,957,446 A | 9/1999 | Takanuma | |
| 2008/0095546 A1* | 4/2008 | Abe | G03G 15/2028 399/21 |

FOREIGN PATENT DOCUMENTS

JP          3604056      12/2004
JP      2012-071916       4/2012

* cited by examiner

*Primary Examiner* — Houshang Safaipour
(74) *Attorney, Agent, or Firm* — Harness, Dickey & Pierce P.L.C.

(57) ABSTRACT

An image forming apparatus includes a first detection unit configured to output a first detection signal upon detecting a recording medium; a second detection unit configured to output a second detection signal upon detecting the recording medium, which is conveyed from the first detection unit; a signal generation unit configured to generate a substitute signal for the first detection signal in a case where the first detection unit does not output the first detection signal; and a state determination unit configured to determine a state of the image forming apparatus based on the first and second detection signals. The state determination unit determines that the first detection unit is in a failure state upon receiving the second detection signal and the substitute signal, which is input instead of the first detection signal.

10 Claims, 8 Drawing Sheets

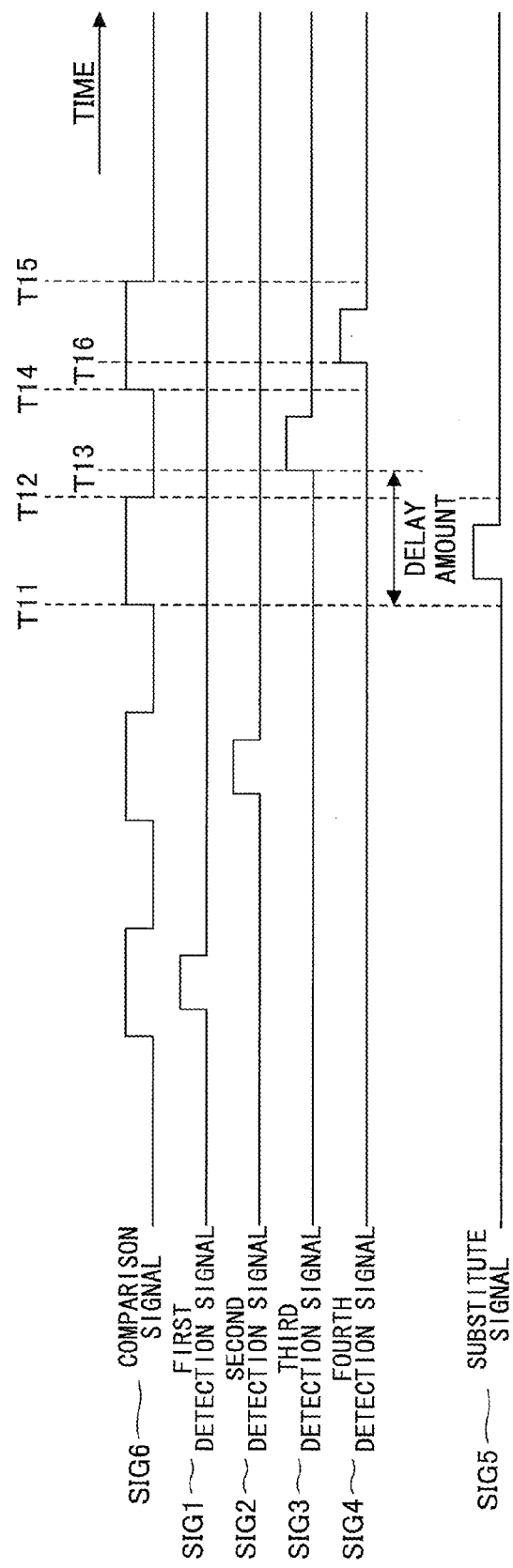

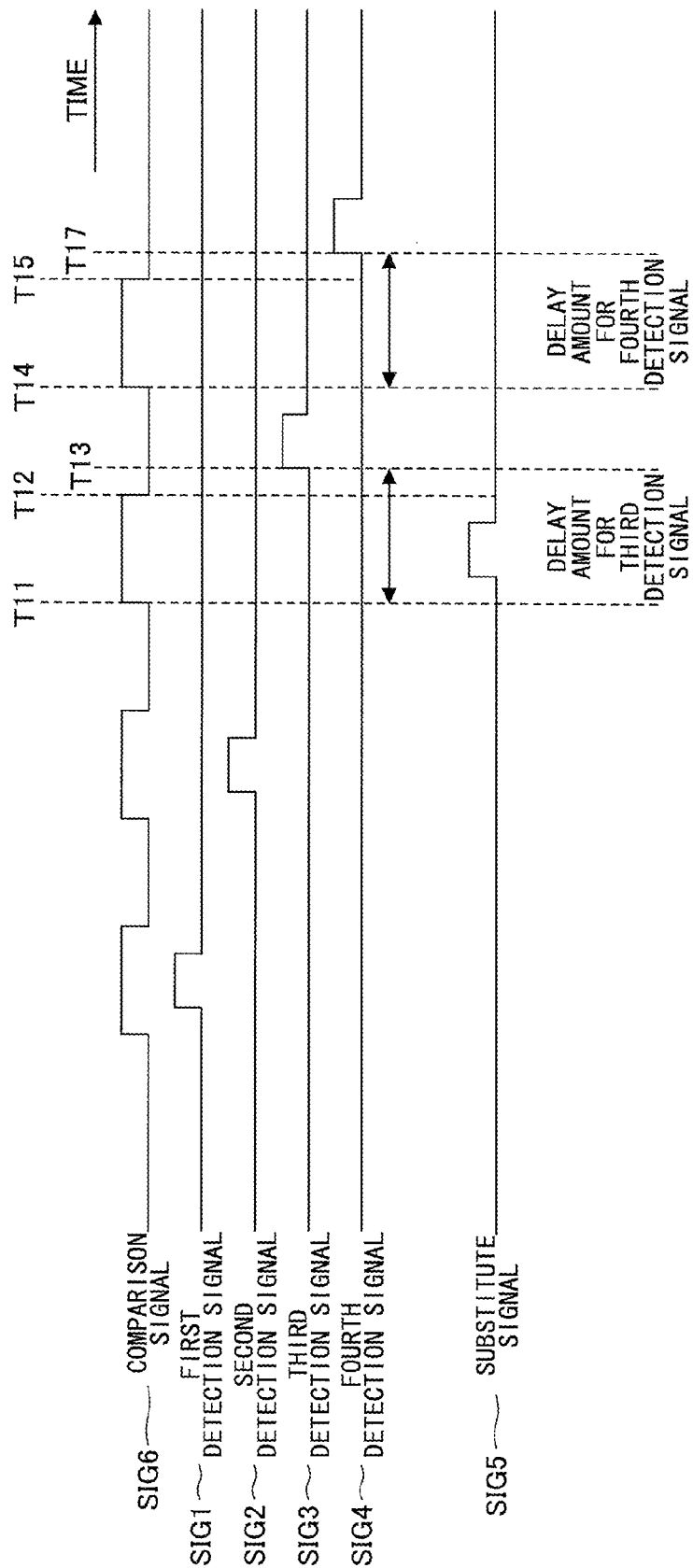

FIG.8

| FIRST DETECTION SIGNAL | SECOND DETECTION SIGNAL | THIRD DETECTION SIGNAL | FOURTH DETECTION SIGNAL | RESULT OF DETERMINATION |
|---|---|---|---|---|
| DETECTED /NOT DELAYED | DETECTED /NOT DELAYED | DETECTED /NOT DELAYED | DETECTED /NOT DELAYED | RESPECTIVE SENSORS DETECT RECORDING MEDIUM RECORDING MEDIUM IS CONVEYED IMAGE FORMING APPARATUS IS IN "NORMAL" STATE |
| DETECTED /NOT DELAYED | DETECTED /NOT DELAYED | DELAYED/GENERATE SUBSTITUTE SIGNAL FOR THIRD DETECTION SIGNAL | DETECTED /NOT DELAYED | AGING DETERIORATION OR THE LIKE OCCURS IN DETECTION MECHANISM |
| DETECTED /NOT DELAYED | DETECTED /NOT DELAYED | DELAYED/GENERATE SUBSTITUTE SIGNAL FOR THIRD DETECTION SIGNAL | DELAYED | AGING DETERIORATION OR THE LIKE OCCURS IN CONVEYANCE MECHANISM |
| DETECTED /NOT DELAYED | DETECTED /NOT DELAYED | NOT DETECTED | NOT DETECTED | PAPER JAM OR THE LIKE OCCURS IN CONVEYANCE PATH IMAGE FORMING APPARATUS IS IN "JAM" STATE |

IMAGE FORMING APPARATUS AND PROGRAM THEREOF

BACKGROUND OF THE INVENTION

1. Field of the Invention

The disclosures herein generally relate to an image forming apparatus and a program thereof.

2. Description of the Related Art

Conventionally, some image forming apparatuses are provided with sensors for detecting passage of recording media. In the above-described image forming apparatuses, a method of estimating a failure location in the sensor by comparing a number of recording media detected by the sensor and a number of recording media that passed the sensor has been known (See, for example, Japanese Published Patent Application No. 2012-71916).

Furthermore, Japanese Patent No. 3604056 discloses a sheet feeding apparatus includes a main body power source for selectively supplying power to sections of the apparatus and a sheet containing section for containing plural sheets, and a manual sheet feeding entrance for feeding a sheet by manual operation.

However, in the method disclosed in Japanese Published Patent Application No. 2012-071916, since a substitute signal is not used, the image forming apparatus may halt its operation or a status of the image forming apparatus cannot be recognized in a case of the sensor failure or the like.

SUMMARY OF THE INVENTION

It is a general object of at least one embodiment of the present invention to provide an image forming apparatus and a program thereof that substantially obviate one or more problems caused by the limitations and disadvantages of the related art.

In one embodiment, an image forming apparatus includes a first detection unit configured to output a first detection signal upon detecting a recording medium; a second detection unit configured to output a second detection signal upon detecting the recording medium, which is conveyed from the first detection unit; a signal generation unit configured to generate a substitute signal for the first detection signal in a case where the first detection unit does not output the first detection signal; and a state determination unit configured to determine a state of the image forming apparatus based on the first detection signal and the second detection signal. The state determination unit determines that the first detection unit is in a failure state upon receiving the second detection signal and the substitute signal, which is input instead of the first detection signal.

In another embodiment, a non-transitory computer-readable storage medium stores a program for causing an image forming apparatus including a first detection unit and a second detection unit to perform a process of forming an image on a recording medium. The process includes a first detection step of the first detection unit outputting a first detection signal upon detecting the recording medium; a signal generation step of generating a substitute signal for the first detection signal in a case where the first detection signal is not output; a second detection step of the second detection unit outputting second detection signal upon detecting the recording medium, which is conveyed from the first detection unit; and a state determination step of determining a state of the image forming apparatus based on the first detection signal and the second detection signal. In the state determination step, the first detection unit is determined to be in a failure state in a case where the second detection signal and the substitute signal, which is input instead of the first detection signal, are received.

According to the present invention, reliability of the image forming apparatus is improved and the state of the image forming apparatus can be recognized easily in the case of the sensor failure or the like.

BRIEF DESCRIPTION OF THE DRAWINGS

Other objects and further features of embodiments will be apparent from the following detailed description when read in conjunction with the accompanying drawings, in which:

FIG. 6 is a timing chart for explaining an example of determination for a detection mechanism based on an amount of delay according to a second embodiment;

FIG. 7 is a timing chart for explaining an example of determination for a conveyance mechanism based on the amount of delay according to the second embodiment; and FIG. 8 is a table for explaining an example of determination based on a detection signal according to the first and second embodiments.

DESCRIPTION OF THE PREFERRED EMBODIMENTS

In the following, embodiments of the present invention will be described with reference to the accompanying drawings.

First Embodiment

Figure 1:
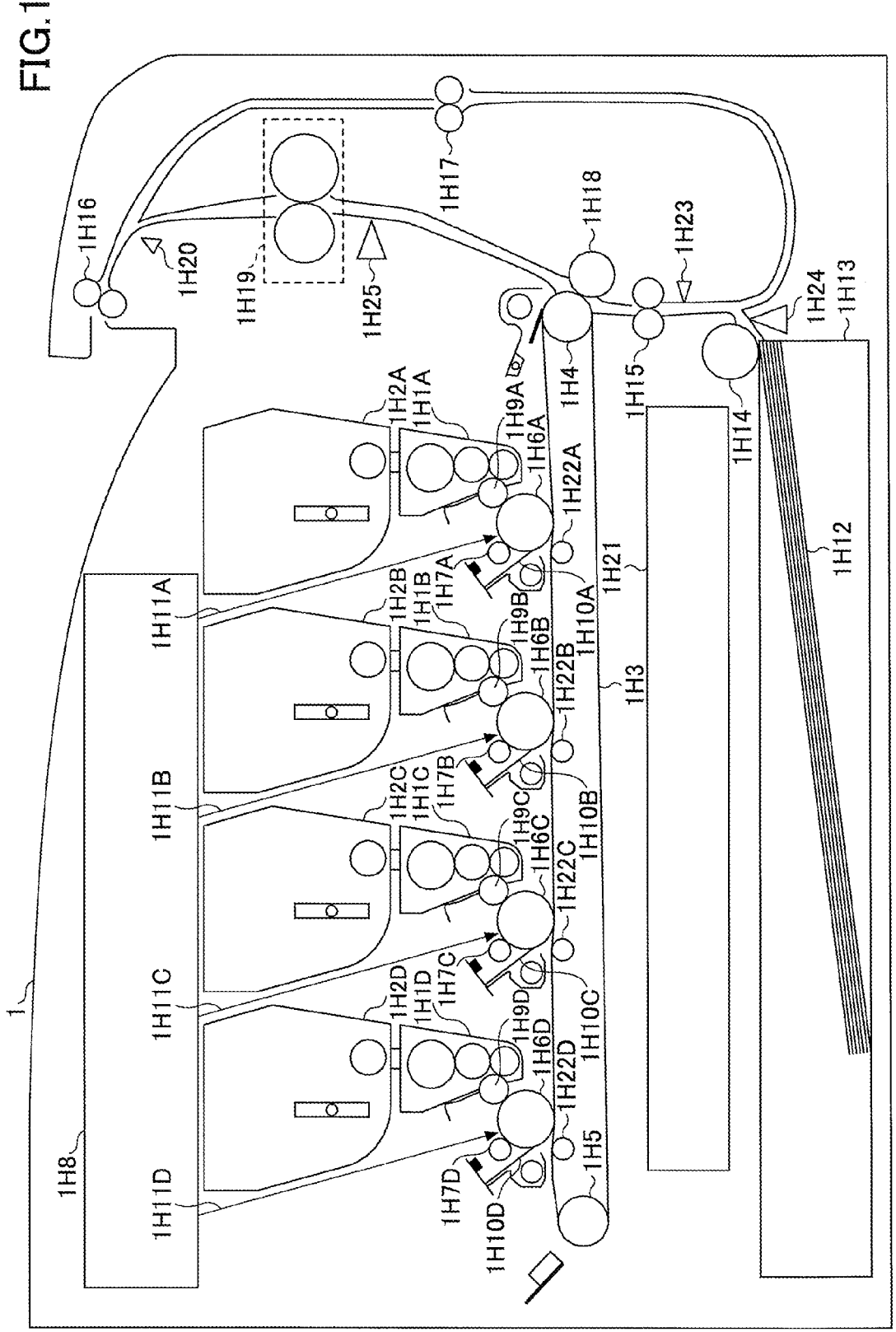
FIG. 1 is a diagram illustrating an example of an entire configuration of an image forming apparatus according to a first embodiment.

FIG. 1 is a diagram illustrating an example of an entire configuration of an image forming apparatus according to a first embodiment.

The image forming apparatus 1 according to a first embodiment illustrates an example of the image forming apparatus of the present invention. The image forming apparatus 1, for example, an electrophotographic image forming apparatus provided with a secondary transfer mechanism called a tandem system in forming color images. In the following, the image forming apparatus illustrated in FIG. 1 will be explained.

The image forming apparatus includes developing units for the respective colors 1H1A, 1H1B, 1H1C and 1H1D, toner containers for the respective colors 1H2A, 1H2B, 1H2C and 1H2D, and a transfer belt 3. Furthermore, the image forming apparatus 1 includes a transfer belt drive roller 1H4 and a transfer belt tension roller 1H5.

The developing units for the respective colors 1H1A, 1H1B, 1H1C and 1H1D, and the toner containers for the respective colors 1H2A, 1H2B, 1H2C and 1H2D are arranged, for example, along the transfer belt 3.

The developing units 1H1A, 1H1B, 1H1C and 1H1D and the toner containers 1H2A, 1H2B, 1H2C and 1H2D correspond to the colors, respectively. The colors include, for example, yellow (Y), cyan (C), magenta (M), black (K) or the like. In the following, the colors may be indicated appropriately by symbols shown in the parentheses.

The transfer belt 3 is held by the transfer belt drive roller 1H4 and the transfer belt tension roller 1H5, and is driven by a rotation of the transfer belt drive roller 1H4.

The developing unit 1H1A includes a photoconductor 1H6A, a charging device 1H7A, an exposure device 1H8A, a developing device 1H9A and a cleaner blade 1H10A.

The charging device 1H7A, the exposure device 1H8A, the developing device 1H9A and the cleaner blade 1H10A are arranged on the periphery of the photoconductor 1H6A.

Since the developing units 1H1B, 1H1C and 1H1D have the same configuration as that of the developing unit 1H1A, explanations will be omitted.

The exposure device 1H8 emits laser lights corresponding to the respective colors 1H11A, 1H11B, 1H11C and 1H11D.

The image forming apparatus 1 further includes a paper feeding tray 1H13, a paper feeding roller 1H14, a registration roller 1H15, a paper ejection roller 1H16, a double-side roller 1H17 and a secondary transfer roller 1H18. Furthermore, the image forming apparatus 1 includes a fixing device 1H19, a waste toner box 1H21 and primary transfer rollers for the respective colors 1H22A, 1H22B, 1H22C and 1H22D.

The image forming apparatus 1 further includes, for example, a paper ejection sensor 1H20, a registration sensor 1H23, a paper feeding sensor 1H24 and a fixing sensor 1H25. Details of the above-described sensors will be described later.

The paper feeding tray 1H13 accommodates recording media 1H12. The recording media 1H12 include, for example, papers, high-quality papers, plastic sheets, metallic sheets or the like. In the following, the case where the recording media are papers will be illustrated.

The paper feeding roller 1H14 is a mechanism for conveying a recording medium 1H12 from the paper feeding tray 1H13.

The registration roller 1H15 is a mechanism for conveying the recording medium 1H12 conveyed by the paper feeding roller 1H14 to the secondary transfer roller 1H18.

Details of the paper feeding roller 1H14 and the registration roller 1H15 will be described later.

The paper ejection roller 1H16 is a mechanism for ejecting the recording medium 1H12 from the image forming apparatus 1.

The double-sided roller 1H17 is a mechanism for conveying the recording medium 1H12, upon performing the image formation on both sides of the recording medium 1H12, so that after the image formation is performed on one side of the recording medium 1H12 the image formation is performed on the other side of the recording medium 1H12.

The secondary transfer roller 1H18 is a mechanism for performing a so-called "secondary transfer", i.e. transferring n image formed on the transfer belt 1H3 onto the recording medium 1H12.

The fixing device 1H19 is a device for fixing toners transferred on the recording medium 1H12 by the secondary transfer.

The paper ejection sensor 1H20 is a sensor for detecting the recording medium 1H12 to be ejected by the paper ejection roller 1H16.

The waste toner box 1H12 is a container for collecting a pattern formed on the transfer belt 1H3 or toners remaining on the transfer belt 1H13 which were not transferred onto the recording medium 1H12.

<Outline of Operation of Image Forming Apparatus>

The image forming apparatus, upon performing an image formation, charges the photoconductors of the respective colors 1H6A, 1H6B, 1H6C and 1H6D by the charging units 1H7A, 1H7B, 1H7C and 1H7D, respectively.

The exposure unit 1H8 emits laser lights 1H11A, 1H11B, 1H11C and 1H11D on the charged photoconductors 1H6A, 1H6B, 1H6C and 1H6D, performs exposure and forms electrostatic latant images, respectively.

The developing devices 1H9A, 1H9B, 1H9C and 1H9D stick toners to the electrostatic latent images formed on the photoconductors 1H6A, 1H6B, 1H6C and 1H6D, performs developing and forms toner images, respectively.

Next, a so-called "primary transfer" is performed for the toner images by the photoconductors 1H6A, 1H6B, 1H6C and 1H6D contacting with the transfer belt 1H3. The primary transfer is performed by the primary transfer rollers of the respective colors 1H22A, 1H22B, 1H22C and 1H22D. The toner images are formed on the transfer belt 1H3 by the primary transfer.

After the primary transfer ends, toners remaining on the photoconductors 1H6A, 1H6B, 1H6C and 1H6D are removed by the cleaner blades 1H10A, 1H10B, 1H10C and 1H10D, respectively.

A toner image formed in the developing unit 1H1A is conveyed to the next developing unit 1H1B by the transfer belt 3. Similarly, the developing unit 1H1B, 1H1C and 1H1D perform transfers so that toner images of the respective colors are superimposed each other. By the developing units 1H1A, 1H1B, 1H1C and 1H1D a full-color toner image is formed.

The full-color toner image formed on the transfer belt 3 is conveyed to the secondary transfer roller 1H18, which performs a secondary transfer, by the transfer belt 3.

The recording medium 1H12 is conveyed from the paper feeding tray 1H13 to the registration roller 1H15 by the paper feeding roller 1H14. The conveyed recording medium 1H12 is further conveyed to the secondary transfer roller 1H18, which performs the secondary transfer, by the registration roller 1H15.

The conveyance of the recording medium 1H12 by the registration roller 1H15 and the conveyance of the toner image by the transfer belt 1H3 are performed at a timing that the toner image is transferred onto the recording medium 1H12 at a predetermined position. That is, at the timing that the recording medium 1H12 and the toner image overlap each other at a position of the secondary transfer roller 1H18 that performs the secondary transfer, the registration roller 1H15 and the transfer belt driving roller 1H4 start driving.

The secondary transfer roller 1H18 performs the secondary transfer for the toner image on the transfer belt 1H3 onto the recording medium 1H12 conveyed by the registration roller 1H15. The fixing device performs a fixing process, such as heating or pressurizing for the recording medium 1H12 on which the secondary transfer was performed.

The recording medium 1H12 on which the fixing process is performed is ejected to the outside of the image forming apparatus 1 by the paper ejection roller 1H16.

In the case of so-called "double sided printing", the recording medium 1H12 on which the fixing process is performed is conveyed to the registration roller 1H15 by the double-sided roller 1H17. The recording medium 1H12 conveyed to the registration roller 1H15 is conveyed by the registration roller 1H15 again. For the recording medium 1H12 conveyed by the registration roller 1H15 again the secondary transfer and the fixing process are performed on the side where the image formation has not been performed. Then, the recording medium 1H12 is ejected to the outside of the image forming apparatus 1 by the paper ejection roller 1H16.

The developing units of the respective colors 1H1A, 1H1B, 1H1C and 1H1D are provided with toner amount sensors (not shown) for detecting amounts of toners. The toner amount sensor determines whether the amount of toner in the developing unit is less than or equal to a predetermined amount. In the case where it is determined that the amounts of toners in the developing units are less than or equal to the predetermined amount, toners are supplied from the toner containers of the respective colors 1H2A, 1H2B, 1H2C and 1H2D.

<Detection of Recording Medium>

The detection unit includes, for example, the paper ejection sensor 1H20, the registration sensor 1H23, the paper feeding sensor 1H24 and the fixing sensor 1H25. In the following, the paper ejection sensor 1H20, the registration sensor 1H23, the paper feeding sensor 1H24 and the fixing sensor 1H25 are explained as examples.

The sensor is placed, for example, between the paper feeding tray 1H13 and the paper ejection roller 1H16, i.e. on a conveyance path on which the recording medium 1H12 is conveyed from the paper feeding to the paper ejection. Each sensor detects a recording medium 1H12 passing through the position where the sensor is located. For example, the paper feeding sensor 1H24 detects a recording medium 1H12 fed by the paper feeding roller 1H14. The registration sensor 1H23 detects a recording medium 1H12 fed by the paper feeding roller 1H14 and conveyed to the registration roller 1H15. The fixing sensor 1H25 detects a recording medium 1H12 conveyed to the fixing device 1H19. The paper ejection sensor 1H20 detects a recording medium 1H12 conveyed to the paper ejection sensor 1H16.

From the paper feeding to the paper ejection for a recording medium 1H12 in the image forming apparatus 1, the recording medium 1H12 is detected by the paper feeding sensor 1H24, the registration sensor 1H23, the fixing sensor 1H25, the paper ejection sensor 1H20 and the like. In the following, it will be explained as an example the case where the respective sensors detect a recording medium 1H12, in the order of the detection by the paper feeding sensor 1H24, the detection by the registration sensor 1H23, the detection by the fixing sensor 1H25 and the detection by the paper ejection sensor 1H20, when processes from the paper feeding to the paper ejection are performed.

Meanwhile, positions where the detection units are placed, a number of the detection unit which are placed and an order of the placed detection units are not limited to those illustrated in FIG. 1. For example, the detection unit may be placed at a position other than that shown in FIG. 1.

<Hardware Configuration>

Figure 2:
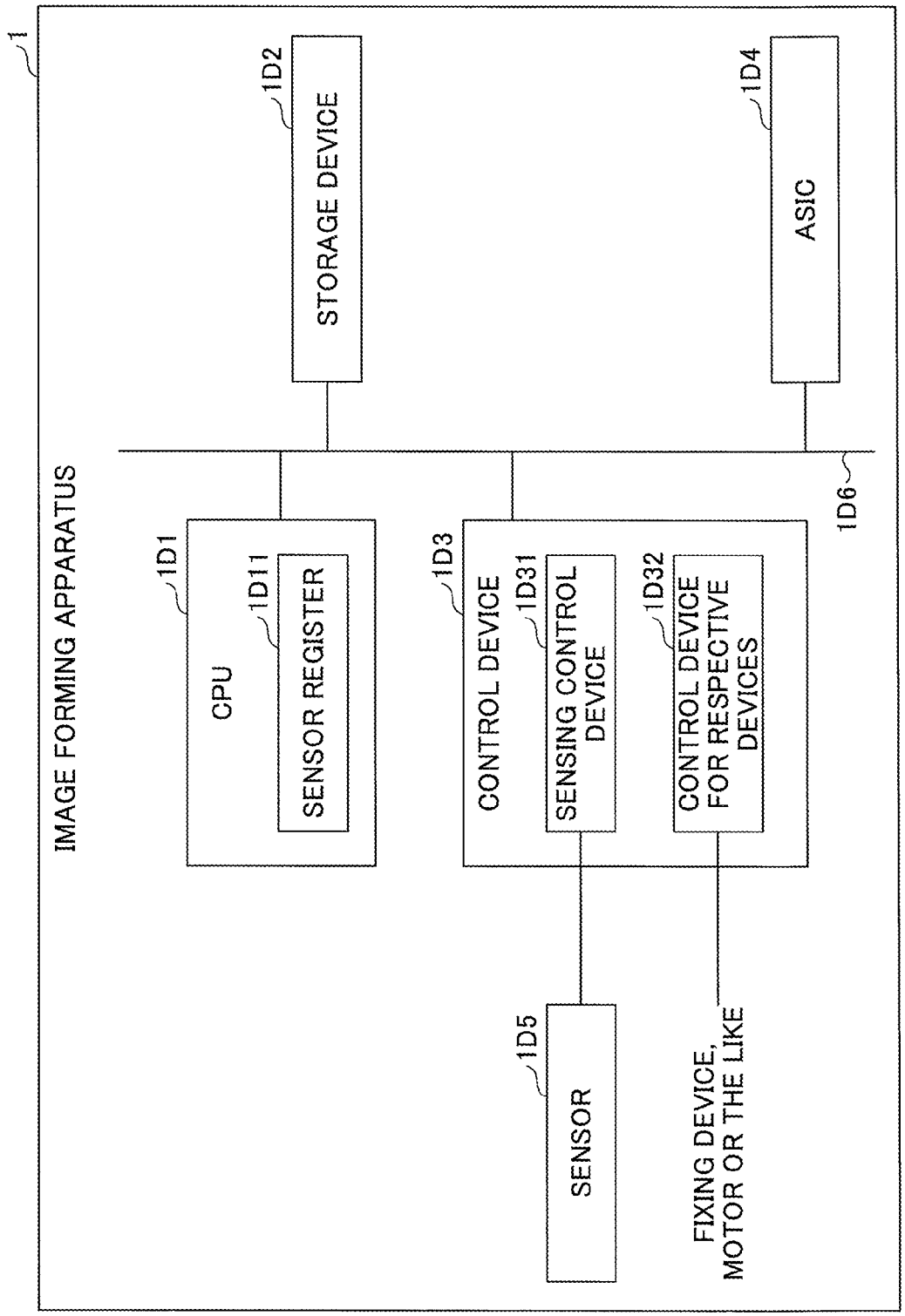
FIG. 2 is a block diagram for explaining an example of a hardware configuration of the image forming apparatus according to the first embodiment.

FIG. 2 is a block diagram for explaining an example of a hardware configuration of the image forming apparatus according to the first embodiment.

The image forming apparatus 1 includes, for example, an electronic circuit substrate (not shown), and includes hardware on the electronic circuit substrate which is configured as shown in FIG. 2.

The image forming apparatus 1 includes a CPU (Central Processing Unit) 1D1, a storage device 1D2 and a control device 1D3. The image forming apparatus 1 further includes an ASIC (Application Specific Integrated Circuit) 1D4 and a sensor 1D5. The respective elements included in the image forming apparatus 1 are connected via a bus 1D6, and data, signals or the like are sent to or received from each other.

Meanwhile, connection to the bus 1D6 may be a configuration of a connection via a bridge circuit (not shown). Moreover, the configuration of the image forming apparatus 1 is not limited to the connection configuration shown in FIG. 2. For example, the image forming apparatus may be configured so that plural buses are provided and a configuration element, which performs a process according to a fast transmission, such as an input to/output from the CPU 1D1 and a configuration element, which performs a process according to a slow transmission, such as an input interface device (not shown) are connected to different buses, respectively.

The CPU 1D1 performs various processes that the image forming apparatus 1 performs. For example, the CPU 1D1 acquires data or a program stored in the storage device 1D2, which will be described later, via the bus 1D7. Moreover, the CPU 1D1 outputs an instruction, a parameter or the like to the control device 1D3 and the ASIC 1D4, which will be described later, via the bus 1D6, thereby controls the entire image forming apparatus 1.

The CPU 1D1 performs various determinations based on a signal input from the sensor 1D5, which will be described later, by the sensing control device 1D31, which will be described later. The CPU 1D1 includes a sensor register 1D11. The sensor register 1D11 is a port for inputting information of a signal to the CPU 1D1, wherein the sensor register 1D11 being provided for each signal correspondingly.

The CPU 1D1 controls the devices included in the image formation apparatus 1, such as the fixing device 1H19 in FIG. 1, a motor (not shown) for the paper feeding roller 1H14 in FIG. 1 and the like, for example, through a control device for respective devices 1D32, which will be described later.

Meanwhile, the CPU 1D1 may be configured by plural devices or plural cores so as to speed up processes by a parallel processing. Moreover, the processes by the CPU 1D1 may be performed by a distributed processing or the parallel processing wherein a separated hardware resource (not shown) is provided inside or outside the image forming apparatus 1 and assists the CPU 1D1.

The storage device 1D2 is a so-called "main storage unit", an auxiliary storage unit or the like, such as a memory, a register, a hard disk (HD) or the like, which is provided with a storage area and a control device. The storage device 1D2 stores, for example, information such as various data including intermediate results of processes based on the control by the CPU 1D1, parameters or programs.

The control device 1D3 performs control for various devices included in the image forming apparatus 1. The control device 1D3 includes, for example, the sensing control device 1D31 and the control device for respective devices 1D32.

The sensing control device 1D31 controls the sensor 1D5. The control device for respective devices 1D32 controls devices included in the image forming apparatus 1.

The sensor 1D5 includes, for example, the paper ejection sensor 1H20, the registration sensor 1H23, the paper feeding sensor 1H24 and the fixing sensor 1H25. Each of the sensors detects presence or absence of a recording medium 1H12 and outputs a signal. For example, the registration sensor 1H23 detects whether a recording medium 1H12 is conveyed to the registration roller in FIG. 1. In the case where the recording medium 1H12 is conveyed to the registration roller in FIG. 1, the registration sensor 1H23 output a signal of a predetermined potential. The sensing control device 1D31 performs a process such as A/D conversion and detects whether the recording medium 1H12 is conveyed to the registration roller in FIG. 1 based on the signal output from the registration sensor 1H23.

The control device for respective devices 1D32 controls the respective devices, for example, by transmitting a control signal or supplying electric power to the respective devices based on an instruction from the CPU 1D1.

The ASIC 1D4 is a processing circuit for performing specific processing, such as image processing, for example. Based on the instruction from the CPU 1D1, for example, the ASIC 1D4 performs processing for generating image data for an image formed on the recording medium 1H12.

Meanwhile, the ASIC 1D4 is not limited to an ASIC. The ASIC 1D4 may be realized by, instead of an ASIC, an FPGA (Field-Programmable Gate Array), a CPLD (Complex Programmable Logic Device) or the like.

Meanwhile, the hardware configuration is not limited to the configuration illustrated in FIG. 2. For example, the configuration may include other device.

<Functional Configuration>

Figure 3:
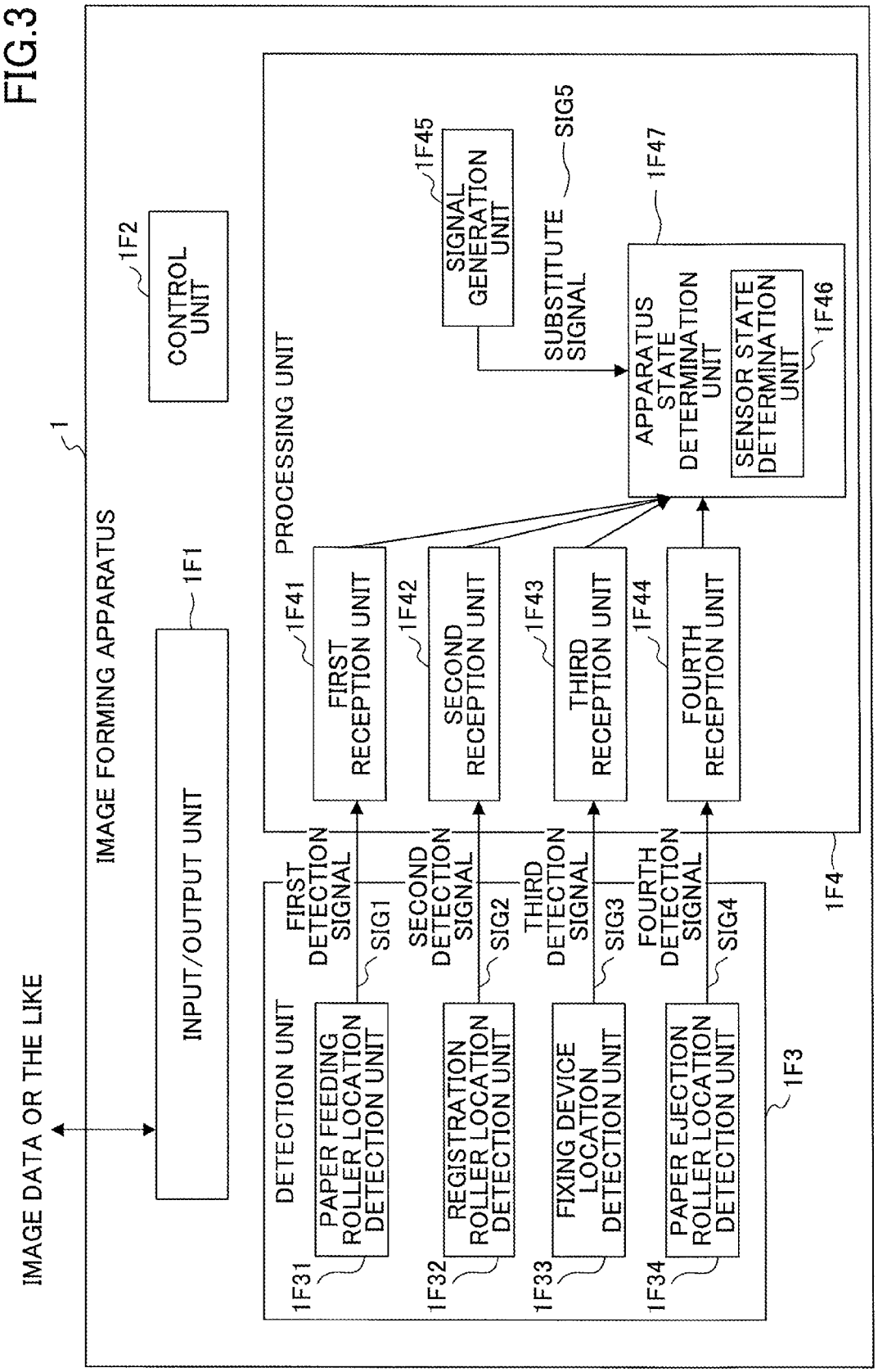
FIG. 3 is a block diagram for explaining an example of a functional configuration of the image forming apparatus according to the first embodiment.

FIG. 3 is a block diagram for explaining an example of a functional configuration of the image forming apparatus according to the first embodiment.

The image forming apparatus 1 includes an input/output unit 1F1, a control unit 1F2, a detection unit 1F3 and a processing unit 1F4.

The input/output unit 1F1 inputs/outputs information such as data or an operation by a user to/from the image forming apparatus 1. The input/output unit 1F1 is realized, for example, by the CPU 1D1 in FIG. 2, the control device for respective devices 1D32 and the like. For example, the CPU 1D1 in FIG. 2 and the control device for respective devices 1D32 realize a process for inputting/outputting information such as image data by controlling an input device (not shown) and an output device (not shown) included in the image forming apparatus 1.

The control unit 1F2 controls the respective devices included in the image forming apparatus 1. The control unit 1F2 is realized by the CPU 1D1 in FIG. 2, the control device 1D3 and the like. The control device 1F2 realizes, for example, the respective processes performed upon the image formation such as the conveyance, the transfer, the fixing and the like, by controlling the respective devices.

The detection unit 1F3 detects a recording medium 1H12 at a predetermined location and outputs a detection signal. Details of the detection signal will be described later. The detection unit 1F3 includes a paper feeding roller location detection unit 1F31, a registration roller location detection unit 1F32, a fixing device location detection unit 1F33 and a paper ejection roller location detection unit 1F34.

The paper feeding roller location detection unit 1F31 is realized by the paper feeding sensor 1H24 in FIG. 1, which is a sensor in FIG. 2, and the sensing control device 1D31 in FIG. 2. When a recording medium 1H12 is conveyed at the location of the paper feeding roller 1H14 in FIG. 1, the paper feeding roller location detection unit 1F31 outputs a first detection signal SIG1, which is a detection signal.

The registration roller location detection unit 1F32 is realized by the registration sensor 1H23 in FIG. 1, which is a sensor in FIG. 2, and the sensing control device 1D31 in FIG. 2. When a recording medium 1H12 is conveyed at the location of the registration roller 1H15 in FIG. 1, the registration roller location detection unit 1F32 outputs a second detection signal SIG2, which is a detection signal.

The fixing device location detection unit 1F33 is realized by the fixing sensor 1H25 in FIG. 1, which is a sensor in FIG. 2, and the sensing control device 1D31 in FIG. 2. When a recording medium 1H12 is conveyed at the location of the fixing device 1H19 in FIG. 1, the fixing device location detection unit 1F33 outputs a third detection signal SIG3, which is a detection signal.

The paper ejection roller location detection unit 1F34 is realized by the paper ejection sensor 1H20 in FIG. 1, which is a sensor in FIG. 2, and the sensing control device 1D31 in FIG. 2. When a recording medium 1H12 is conveyed at the location of the paper ejection sensor 1H20 in FIG. 1, the paper ejection roller location detection unit 1F34 outputs a fourth detection signal SIG4, which is a detection signal.

The processing unit 1F4 performs the respective processes. The processing unit 1F4 is realized by the CPU 1D1 in FIG. 2 and the like. The processing unit 1F4 includes a first reception unit 1F41, a second reception unit 1F42, a third reception unit 1F43, a fourth reception unit 1F44, a signal generation unit 1F45, a sensor state determination unit 1F46 and an apparatus state determination unit 1F47.

When the paper feeding roller location detection unit 1F31 detects a recording medium 1H12, the first detection signal SIG1 is input to the first reception unit 1F41.

When the registration roller location detection unit 1F32 detects a recording medium 1H12, the second detection signal SIG2 is input to the second reception unit 1F42.

When the fixing device location detection unit 1F33 detects a recording medium 1H12, the third detection signal SIG3 is input to the third reception unit 1F43.

When the paper ejection roller location detection unit 1F34 detects a recording medium 1H12, the fourth detection signal SIG4 is input to the fourth reception unit 1F44.

The signal generation unit 1F45 generates a substitute signal SIG5 as a substitute for the first, second, third and fourth detection signals (SIG1, SIG2, SIG3 and SIG4) in a predetermined case.

The apparatus state determination unit 1F47 determines a state of a failure or the like including a paper jam in the image forming apparatus 1 (hereinafter, referred to as "jam") and states of the sensors. The sensor state determination unit 1F46 determines a state of failure or the like in each of the sensors. Details of the determination will be described later.

<Determination According to Signal>

Figure 4:
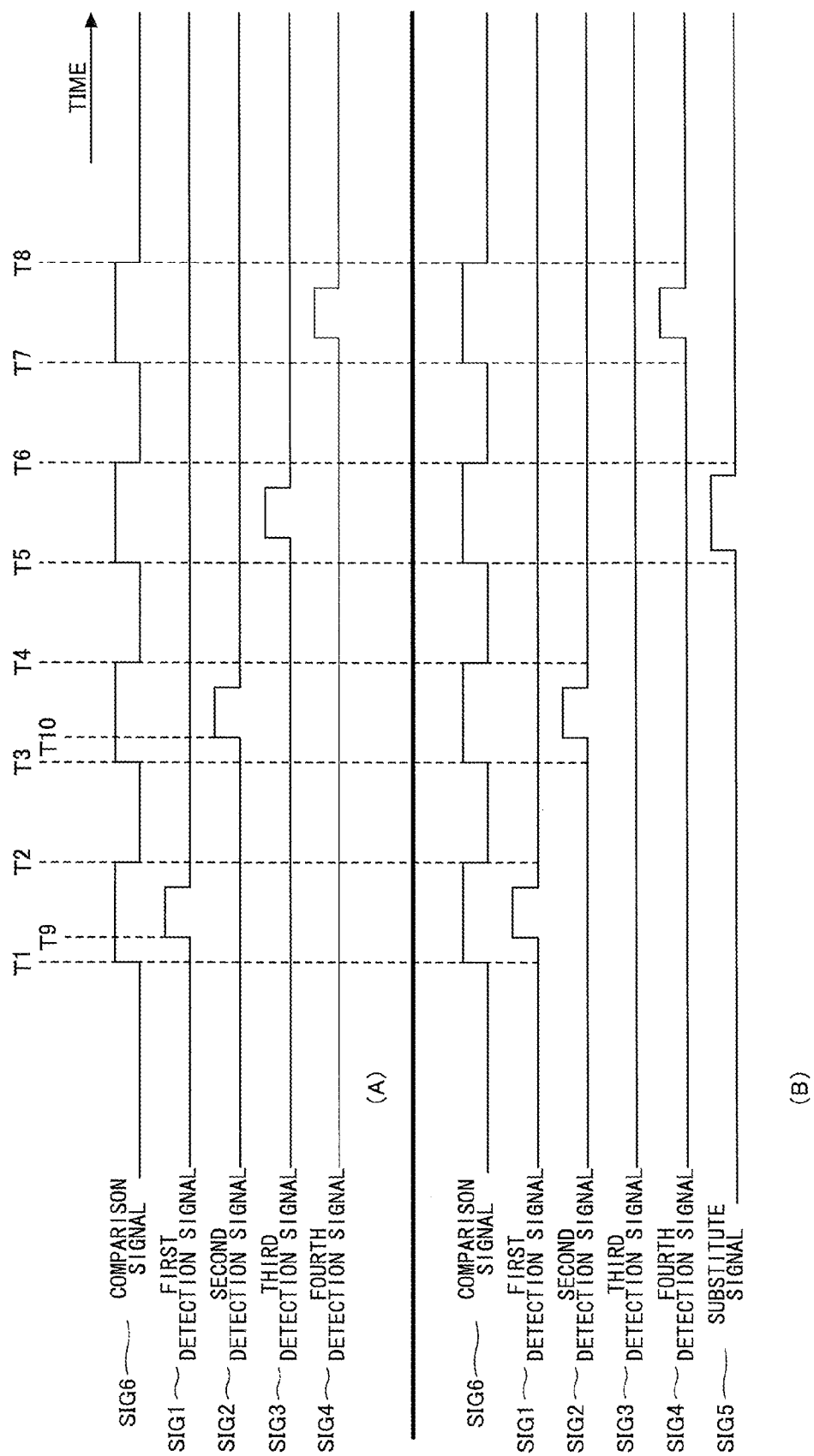
FIG. 4 is a timing chart for explaining an example of determination based on a signal according to the first embodiment.

FIG. 4 is a timing chart for explaining an example of determination based on a signal according to the first embodiment.

In FIG. 4, a case where each signal is a so-called "high active signal" will be explained as an example. A high potential is 5 volts for example, and a low potential is 0 volts for example. In the case where each of the sensors detect a recording medium 1H12, the sensor outputs a signal of the high potential.

The apparatus state determination unit 1F47 in FIG. 3 compares timings of a comparison signal SIG6, for example, and of each of the detected signals, and performs determination. The comparison signal SIG6 is a signal for setting a timing being a criterion of comparison for each of the detected signals. In the following, it will be explained with reference to FIG. 4 as an example.

Assume that in FIG. 4, in the case where an active signal of the first detection signal SIG1 is asserted between a timing T1 and a timing T2, the paper feeding roller location detection unit 1F31 in FIG. 3 detects a recording medium 1H12. That is, in the case where the first detection signal SIG1 is asserted between the timing T1 and the timing T2, the apparatus state determination unit 1F47 determines that the image forming apparatus 1 is a "normal" state to the paper feeding sensor 1H24 without a jam or the like. In FIG. 4, since the first detection signal SIG1 has a rising edge at the timing T9, it is the asserted state.

Similarly, timings T3 and T4 are set in the comparison signal SIG6 for the second detection signal SIG2. Similarly, timings T5 and T6 are set in the comparison signal SIG6 for the third detection signal SIG3. Similarly, timings T7 and T8 are set in the comparison signal SIG6 for the fourth detection signal SIG4.

In an upper part (A) of FIG. 4, the apparatus state determination unit 1F47 determines that a recording medium 1H12 is conveyed to the locations of the paper feeding sensor 1H24, the registration sensor 1H23, the fixing sensor 1H25 and the paper ejection sensor 1H20 in order and that the image forming apparatus 1 is in the "normal" state.

In the following, a case where distances among the paper feeding sensor 1H24, the registration sensor 1H23, the fixing sensor 1H25 and the paper ejection sensor 1H20 are 100 millimeters, the conveyance speed of the recording medium 1H12 is 200 millimeters per second and the timing T9 is 1.0 second will be explained as an example.

Since the first detection signal SIG1 transits from low to high at the timing T9, in the comparison signal SIG6 a criterion for detecting the timing T9, which is the rising edge of the first detection signal SIG1, is set. The criterion is set with a margin taking account of an error or the like. For example, in the case where the margin is 0.1 seconds, the criterion of detecting the timing T9 is set as 0.9 seconds to 1.1 seconds. That is, in the case where the rising edge of the first detection signal occurs between 0.9 seconds to 1.1 seconds, the apparatus state determination unit 1F47 determines that it is the state where the recording medium 1H12 is conveyed to the location of the paper feeding sensor 1H24. When it is determined that it is the state where the recording medium 1H12 is conveyed to the location of the paper feeding sensor 1H24, the apparatus state determination unit 1F47 determines that it is "normal" to the location of the paper feeding sensor 1H24.

In the case where it is "normal" to the location of the paper feeding sensor 1H24, the recording medium is conveyed to the registration sensor 1H23. Time taken from the paper feeding sensor 1H24 to the registration sensor 1H23 is 0.5 seconds. Therefore, in the case where the timing T9 is 1.0 second, the timing T10 of a rising edge of the second detection signal SIG2 is 1.5 seconds. In the same way as the criterion of detecting the timing T9, in the comparison signal SIG6 the criterion of detecting the timing T10, which is the rising edge of the second detection signal SIG2, is set as 1.4 seconds to 1.6 seconds. In the case where the timing T9 is 1.1 seconds, the criterion is set as 1.5 seconds to 1.7 seconds. In the same way as the case of the paper feeding sensor 1H24, when the rising edge of the second detection signal SIG2 occurs within the criterion, the apparatus state determination unit 1F47 determines that it is "normal" from the paper feeding sensor 1H24 to the registration sensor 1H23. In the case where it is "normal" from the paper feeding sensor 1H24 to the registration sensor 1H23, the recording medium 1H12 is conveyed to the location of the fixing sensor 1H25.

Similarly, the apparatus state determination unit 1F47 performs determination to the locations of the registration sensor 1H23 and the fixing sensor 1H25 based on the third detection signal SIG3. In the case of "normal", the recording medium 1H12 is conveyed to the location of the paper ejection sensor 1H20.

Furthermore, the apparatus state determination unit 1F47 performs determination to the locations of the fixing sensor 1H25 and the paper ejection sensor 1H20 based on the fourth detection signal SIG4. In the case of "normal", the recording medium 1H12 is conveyed by the paper ejection roller 1H16 and ejected.

In a lower part (B) of FIG. 4, a substitute signal SIG5 is used. A case where it is determined that the output of the detection unit is not normal is illustrated in the lower part (B) of FIG. 4. In the following, it will be explained with reference to the lower part (B) of FIG. 4 as an example. In this case, the third detection signal SIG3 is not asserted between the timings T5 and T6. Then, the signal generation unit 1F45 in FIG. 3 generates a substitute signal SIG5 which is a signal as a substitute for the third detection signal SIG3. The apparatus state determination unit 1F47 performs determination based on the substitute signal SIG5 instead of the third detection signal SIG3.

If the substitute signal SIG5 is not used instead of the third detection signal SIG3, the apparatus stated determination unit 1F47 determines that a jam occurs in the image forming apparatus 1, and stops the conveyance of recording medium 1H12 in the image forming apparatus 1. By using the substitute signal SIG5, the apparatus state determination unit 1F47 can receive the fourth detection signal SIG4.

The signal generation unit 1F45 generates the substitute signal SIG5 as a substitute for the third detection signal SIG3 based on the first detection signal SIG1 and the second detection signal SIG2. The signal generation unit 1F45 inputs the generated substitute signal SIG5 in the apparatus state determination unit 1F47. When the substitute signal is input to the apparatus state determination unit 1F47, the apparatus state determination unit 1F47, in the same way as the third detection signal SIG3, compares the substitute signal SIG5 with the comparison signal SIG6, and determines that the recording medium 1H12 is conveyed to the location of the fixing sensor 1H25. By inputting the substitute signal SIG5, the image forming apparatus 1 can release the state where the conveyance of recording medium 1H12 is stopped based on the determination by the apparatus state determination unit 1F47.

In the case where the substitute signal SIG5 is input, by conveying the recording medium 1H12, the recording medium 1H12 is conveyed to the location of the paper ejection sensor 1H20 and further.

In the case where the substitute signal SIG5 is input instead of the third detection signal SIG3 and the fourth detection signal SIG4 is not detected, it is determined that there is some defect on a conveyance path, for example. The defect includes a state where the conveyance of the recording medium 1H12 is obstructed due to, for example, abrasion accompanying aging deterioration of a conveyance member or an occurrence of warpage by a rise in temperature or the like. Accordingly, the apparatus state determination unit 1F47 can perform determination of the jam or the like at the fixing sensor 1H25 and on the conveyance path of a recording medium 1H12 by inputting the substitute signal SIG5. Details of the determination of the jam will be described later.

In the case where when the substitute signal SIG5 is input and the recording medium 1H12 is conveyed, the fourth detection signal SIG4 is asserted between the timings T7 and T8, the sensor state determination unit 1F46 determines that the fixing sensor 1H25 is in a state of "failure".

In the case where the fixing sensor 1H25 is determined to be in the state of "failure", the apparatus state determination unit 1F47 determines that a jam does not occur but the fixing sensor 1H25 is in the state of "failure", and identifies the state of the image forming apparatus 1. Accordingly, the apparatus state determination unit 1F47 is made easy to identify the state of the image forming apparatus 1 by using the substitute signal SIG5.

Meanwhile, the present embodiment is not limited to using a so-called "high active signal". Moreover, the present embodiment is not limited to using the rising edge. For example, a falling edge or both edges may be used.

Furthermore, the present embodiment is not limited to using an edge. For example, so-called "detection for level", using a high active signal or a low active signal, which is longer than or equal to a predetermined length, may be used.

Moreover, in the present embodiment, in the case of conveyance of plural recording media, the substitute signal may be generated from the detection signal sequentially from behind depending on a size of the recording medium, the location of the sensor or the like.

<Entire Processing>

Figure 5:
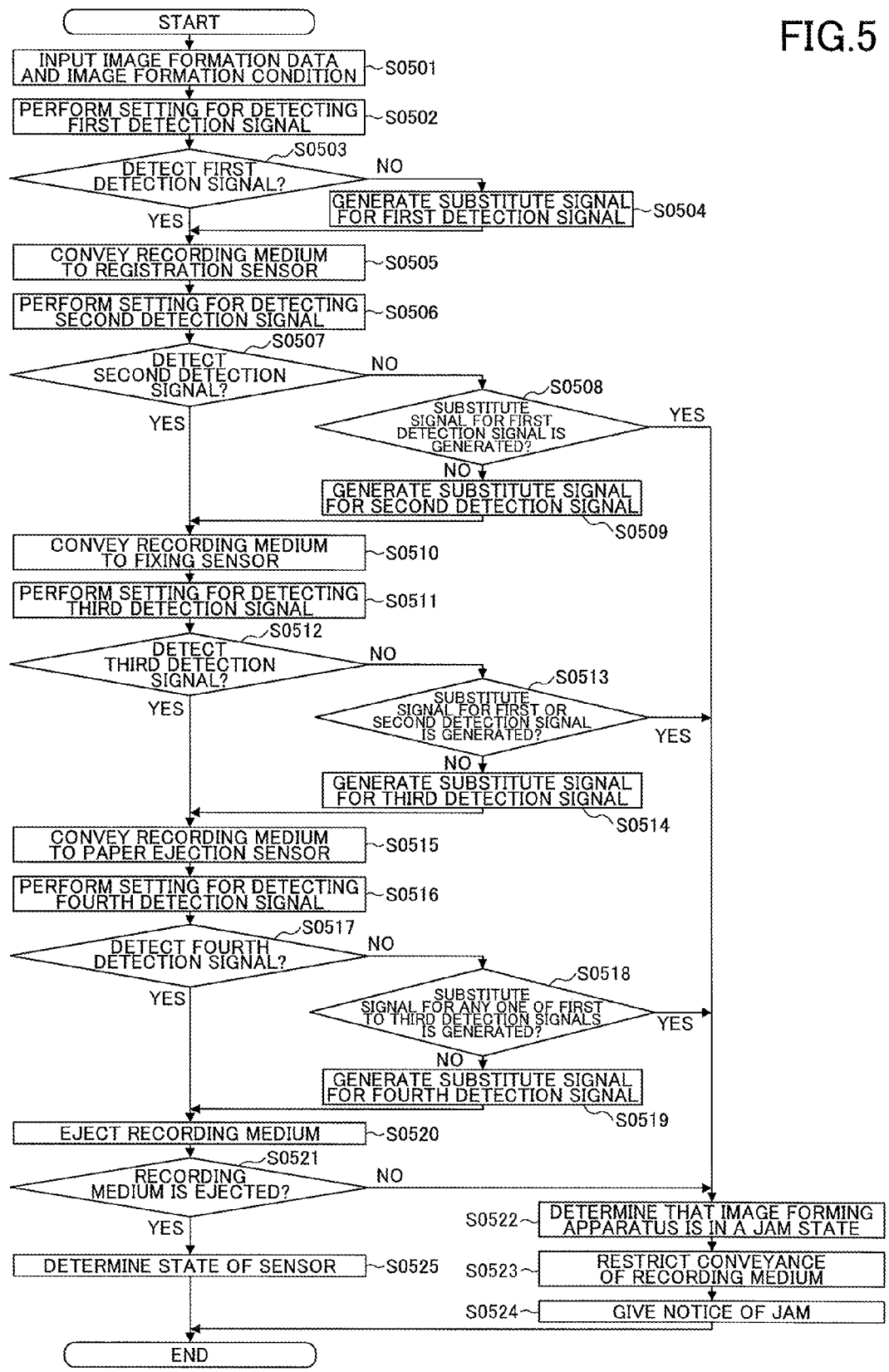
FIG. 5 is a flowchart for explaining an example of entire processing for an image formation according to the first embodiment.

FIG. 5 is a flowchart for explaining an example of the entire process of the image formation according to the first embodiment.

First, the image forming apparatus 1 inputs image formation data, an image formation condition and the like by the input/output unit 1F1 in FIG. 3 (step S0501).

The image forming apparatus 1 performs setting for detecting the first detection signal by the apparatus state determination unit 1F47 (step S0502) in FIG. 3. Processing for setting for detecting the first detection signal includes, for example, calculating a time for the timing of the rising edge of the first detection signal SIG1 in FIG. 4, setting a criterion for detection in the comparison signal SIG6, and the like. In the calculation, for example, a start time is set at a timing when a clutch (not shown) of the paper feeding roller 1H14 in FIG. 1 turns to ON, and the criterion of detecting the rising edge of the first detection signal SIG1 is calculated from a distance to the paper feeding sensor 1H24.

The image forming apparatus 1 determines whether the first detection signal is detected by the apparatus state determination unit 1F47 in FIG. 3 (step S0503). In the case where the first detection signal is detected (step S0503: YES), the process of the image forming apparatus 1 proceeds to step S0505. When the first detection signal is not detected (step S0503: NO), the process of the image forming apparatus 1 proceeds to step S0504. At step S0503, the image forming apparatus 1 performs determination according to whether the first detection signal SIG1 is asserted based on the criterion set at step S0502.

At step S0504, the image forming apparatus 1 generates a substitute signal for the first detection signal by the signal generation unit 1F45 in FIG. 3. The image forming apparatus 1 generates the substitute signal SIG5 as a substitute for the first detection signal SIG1 by the signal generation unit 1F45 in FIG. 3.

At step S0505, the image forming apparatus 1 conveys a recording medium 1H12 to the location of the registration sensor 1H23 by the control unit 1F2 in FIG. 3. At step S0505, the image forming apparatus 1 controls a motor (not shown) for the paper feeding roller 1H14 or the like to convey the recording medium 1H12 to the registration sensor 1H23.

Next, the image forming apparatus 1 performs setting for detecting the second detection signal by the apparatus state determination unit 1F47 (step S0506) in FIG. 3. Processing for setting for detecting the second detection signal includes, for example, calculating a time for the timing of the rising edge of the second detection signal SIG2 in FIG. 4, setting a criterion for detection in the comparison signal SIG6, and the like. In the calculation, for example, the criterion of detecting the rising edge of the second detection signal SIG2 is calculated based on the time for the timing detected at step S0503 and a distance from the paper feeding sensor 1H24 to the registration sensor 1H23.

The image forming apparatus 1 determines whether the second detection signal is detected by the apparatus state determination unit 1F47 in FIG. 3 (step S0507). In the case where the second detection signal is detected (step S0507: YES), the process of the image forming apparatus 1 proceeds to step S0510. When the second detection signal is not detected (step S0507: NO), the process of the image forming apparatus 1 proceeds to step S0508. At step S0507, the image forming apparatus 1 performs determination according to whether the second detection signal SIG2 is asserted based on the criterion set at step S0506.

At step S0508, the image forming apparatus 1 determines whether a substitute signal for the first detection signal is generated by the apparatus state determination unit 1F47 in FIG. 3. That is, at step S0508, the image forming apparatus 1 determines whether the process at step S0504 is performed by the apparatus state determination unit 1F47 in FIG. 3. In the case where the substitute signal for the first detection signal is generated (step S0508: YES), the process of the image forming apparatus 1 proceeds to step S0522. When the substitute signal for the first detection signal is not generated (step S0508: NO), the process of the image forming apparatus 1 proceeds to step S0509.

At step S0509, a substitute signal for the second detection signal is generated by the signal generation unit 1F45 in FIG. 3. The image forming apparatus 1 generates the substitute signal SIG5 as a substitute for the second detection signal SIG2 by the signal generation unit 1F45 in FIG. 3.

At step S0510, the image forming apparatus 1 conveys the recording medium 1H12 to the location of the fixing sensor 1H25 by the control unit 1F2 in FIG. 3. At step S0510, the image forming apparatus 1 controls a motor (not shown) for the registration roller 1H15 or the like to convey the recording medium 1H12 to the fixing sensor 1H25. That is, at step S0510, the image forming apparatus 1 conveys the recording medium 1H12 to the fixing device 1H19.

Next, the image forming apparatus 1 performs setting for detecting the third detection signal by the apparatus state determination unit 1F47 (step S0511) in FIG. 3. Processing for setting for detecting the third detection signal includes, for example, calculating a time for the timing of the rising edge of the third detection signal SIG3 in FIG. 4, setting a criterion for detection in the comparison signal SIG6, and the like. In the calculation, for example, the criterion of detecting the rising edge of the third detection signal SIG3 is calculated based on the time for the timing detected at step S0507 and a distance from the registration sensor 1H23 to the fixing sensor 1H25.

The image forming apparatus 1 determines whether the third detection signal is detected by the apparatus state determination unit 1F47 in FIG. 3 (step S0512). In the case where the third detection signal is detected (step S0512: YES), the process of the image forming apparatus 1 proceeds to step S0515. When the third detection signal is not detected (step S0512: NO), the process of the image forming apparatus 1 proceeds to step S0513. At step S0512, the image forming apparatus 1 performs determination according to whether the third detection signal SIG3 is asserted based on the criterion set at step S0511.

At step S0513, the image forming apparatus 1 determines whether a substitute signal for the first detection signal or the second detection signal is generated by the apparatus state determination unit 1F47 in FIG. 3. That is, at step S0513, the image forming apparatus 1 determines whether the process at step S0504 or the process at step S0509 is performed by the apparatus state determination unit 1F47 in FIG. 3. In the case where the substitute signal for at least one of the first detection signal and the second detection signal is generated (step S0513: YES), the process of the image forming apparatus 1 proceeds to step S0522. When neither the substitute signal for the first detection signal nor the substitute signal for the second detection signal is generated (step S0513: NO), the process of the image forming apparatus 1 proceeds to step S0514.

At step S0514, a substitute signal for the third detection signal is generated by the signal generation unit 1F45 in FIG. 3. The image forming apparatus 1 generates the substitute signal SIG5 as a substitute for the third detection signal SIG3 by the signal generation unit 1F45 in FIG. 3.

At step S0515, the image forming apparatus 1 conveys the recording medium 1H12 to the location of the paper ejection sensor 1H20 by the control unit 1F2 in FIG. 3. At step S0515, the image forming apparatus 1 controls a motor (not shown) for the fixing device 1H19 or the like to convey the recording medium 1H12 to the paper ejection sensor 1H20.

Next, the image forming apparatus 1 performs setting for detecting the fourth detection signal by the apparatus state determination unit 1F47 (step S0516). Processing for setting for detecting the fourth detection signal includes, for example, calculating a time for the timing of the rising edge of the fourth detection signal SIG4 in FIG. 4, setting a criterion for detection in the comparison signal SIG6, and the like. In the calculation, for example, the criterion of detecting the rising edge of the third detection signal SIG3 is calculated based on the time for the timing detected at step S0512 and a distance from the fixing sensor 1H25 to the paper ejection sensor 1H20.

The image forming apparatus 1 determines whether the fourth detection signal is detected by the apparatus state determination unit 1F47 in FIG. 3 (step S0517). In the case where the fourth detection signal is detected (step S0517: YES), the process of the image forming apparatus 1 proceeds to step S0520. When the fourth detection signal is not detected (step S0517: NO), the process of the image forming apparatus 1 proceeds to step S0518. At step S0517, the image forming apparatus 1 performs determination according to whether the fourth detection signal SIG4 is asserted based on the criterion set at step S0516.

At step S0518, the image forming apparatus 1 determines whether a substitute signal for at least any one of the first to third detection signals is generated by the apparatus state determination unit 1F47 in FIG. 3. That is, at step S0518, the image forming apparatus 1 determines whether at least any one of the processes at step S0504, S0509 and S0514 is performed by the apparatus state determination unit 1F47 in FIG. 3. In the case where the substitute signal for at least any one of the first to third detection signals is generated (step S0518: YES), the process of the image forming apparatus 1 proceeds to step S0522. When none of the substitute signals for the first to third detection signals are generated (step S0518: NO), the process of the image forming apparatus 1 proceeds to step S0519.

At step S0519, a substitute signal for the fourth detection signal is generated by the signal generation unit 1F45 in FIG. 3. The image forming apparatus 1 generates the substitute signal SIG5 as a substitute for the fourth detection signal SIG4 by the signal generation unit 1F45 in FIG. 3.

At step S0520, the image forming apparatus 1 ejects the recording medium 1H12 by the control unit 1F2 in FIG. 3. At step S0520, the image forming apparatus 1 controls a motor (not shown) for the paper ejection roller 1H16 or the like to eject the recording medium 1H12 from the image forming apparatus 1.

Next, the image forming apparatus 1 determines whether the recording medium 1H12 is ejected by the control unit 1F2 in FIG. 3 (step S0521). At step S0521, the image forming apparatus 1 determines whether the recording medium 1H12 is ejected according to the process at step S0520. The ejection of the recording medium 1H12 is detected by a sensor (not shown) for detecting the paper ejection, for example. When the paper ejection is detected (step S0521: YES), the process of the image forming apparatus 1 proceeds to step S0525. When the paper ejection is not detected (step S0521: NO), the process of the image forming apparatus 1 proceeds to step S0522.

At step S0522, the image forming apparatus 1 determines that the image forming apparatus 1 is in a state of a jam by the apparatus state determination unit 1F47 in FIG. 3. At step S0522, the image forming apparatus 1 is, for example, in a state where the substitute signal SIG5 for the first detection signal is generated at step S0504 and the second detection signal is not detected at step S0507. The case where the second detection signal is not detected will be explained later in detail. In the image forming apparatus 1 of this state, some failures such as a jam occurs from the paper feeding tray 1H13 to the paper feeding sensor 1H24.

At step S0523, the image forming apparatus 1 restricts the conveyance of a recording medium 1H12 by the control unit 1F2 in FIG. 3. At step S0523, the image forming apparatus 1 is in a state where the sensor is not in the state of failure, but the image forming apparatus 1 is determined to be in the state of a jam. Accordingly, the image forming apparatus 1 performs restriction for the conveyance of the recording medium 1H12, such as stopping the conveyance of the recording medium.

Then, the image forming apparatus 1 gives notice of the jam by the control unit 1F2 in FIG. 3 (step S0524). At step S0524, the image forming apparatus 1 gives notice of a result of determination at step S0522, for example, to a user, a serviceman or the like.

At step S0525, the image forming apparatus 1 determines states of the sensors by the sensor state determination unit 1F46 in FIG. 3. At step S0525, a substitute signal is generated for any one of the first, second, third and fourth detection signals SIG1, SIG2, SIG3 and SIG4, or none of the substitute signals for the first to fourth detection signals are generated. In the case where none of the substitute signals for the first to fourth detection signals are generated, the sensors are in the so-called "normal" state where the paper feeding sensor 1H24, the registration sensor 1H23, the fixing sensor 1H25 and the paper ejection sensor 1H20 detect the conveyed recording medium 1H12.

In the case where the substitute signal for the first detection signal SIG1 is generated at step S0504 and the second detection signal SIG2 is detected at step S0507, the sensor state determination unit 1F46 determines that the paper feeding sensor 1H24 that outputs the first detection signal is in a state of "failure".

In the case where the substitute signal for the second detection signal SIG2 is generated at step S0509 and the third detection signal SIG3 is detected at step S0512, the sensor state determination unit 1F46 determines that the registration sensor 1H23 that outputs the second detection signal is in a state of "failure".

In the case where the substitute signal for the third detection signal SIG3 is generated at step S0514 and the fourth detection signal SIG4 is detected at step S0517, the sensor state determination unit 1F46 determines that the fixing sensor 1H25 that outputs the third detection signal is in a state of "failure".

In the case where the substitute signal for the fourth detection signal SIG4 is generated at step S0519 and the paper ejection is detected at step S0521, the sensor state determination unit 1F46 determines that the paper ejection sensor 1H20 that outputs the fourth detection signal is in a state of "failure".

<Image Formation Using Substitute Signal>

The lower part (B) of FIG. 4 illustrates the case where the fixing sensor 1H25 is determined to be in the state of "failure". In the case where any one of the detection units is determined to be in the state of "failure", the signal generation unit 1F45 generates a substitute signal SIG5 instead of the third detection signal SIG3, and inputs the substitute signal SIG5. Since the substitute signal SIG5 is input, the image forming apparatus 1 can convey the recording medium 1H12. Since the recording medium 1H12 is conveyed, the image forming apparatus 1 can perform the image formation.

If the substitute signal SIG5 is not input, since the fixing sensor 1H25 is in the state of "failure", the third detection signal SIG3 is not output. In the case where the substitute signal SIG5 and the third detection signal SIG3 are not input, the apparatus state determination unit 1F47 determines that the image forming apparatus 1 is in a state where a jam or the like occurs. When the apparatus state determination unit 1F47 determines that it is in the state where the jam or the like occurs, the image forming apparatus 1 stops the conveyance of the recording medium 1H12 and the image formation.

That is, by inputting the substitute signal SIG5, the image forming apparatus 1 can perform the image formation. In the image forming apparatus 1 according to the present embodiment, even if the third detection signal is not output, the image formation may be performed. According to this feature, the mean time between failures (MTBF) of the image forming apparatus 1 can be made longer. By making the MTBF longer, the reliability can be enhanced.

Moreover, in the case illustrated in the lower part (B) of FIG. 4, when the fixing sensor 1H25 is determined to be in the state of "failure", the image forming apparatus 1 gives notice of the result of the determination to a service man or the like who will repair the image forming apparatus 1. The service man or the like easily recognizes that the fixing sensor 1H25 is in the state of failure. Since the state of the image forming apparatus 1 can be recognized in detail, such as the fixing sensor 1H25 being in the state of failure, repair time can be shortened. Accordingly, by determining the state of the image forming apparatus 1 based on the substitute signal SIG5, the mean time to repair (MTTR) can be made shorter. By making the MTTR shorter, the reliability can be enhanced.

Second Embodiment

In a second embodiment, the image forming apparatus 1 shown in FIG. 1 is used as in the first embodiment. Therefore, an explanation for the entire configuration will be omitted.

In the same as in the first embodiment, the case where in the image forming apparatus 1, which performs processes of the paper feeding to the paper ejection for a recording medium, the recording medium is detected by the paper feeding sensor 1H24, the registration sensor 1H23, the fixing sensor 1H25 and the paper ejection sensor 1H20, in this order, will be explained as an example.

In the second embodiment, as in the first embodiment, the apparatus state determination unit 1F47 in FIG. 3 compares timings of a comparison signal SIG6, for example, and of the detected signals and performs determination. In the second embodiment, upon comparing the timings of the comparison signal SIG6 and of each of the detected signals, a delay time (hereinafter, referred to as "delay amount") of each of the detected signals with respect to the comparison signal SIG6 is measured.

The measurement of the delay amount is performed, for example, on the detection at step S0503, S0507, S0512 or S0517.

FIG. 6 is a timing chart for explaining an example of determination for the detection mechanism based on the delay amount according to the second embodiment.

With reference to FIG. 6, an example for the third detection signal SIG3 will be explained. FIG. 6 exemplifies a case where a criterion is set by the comparison signal SIG6 that there is a timing of a rising edge T13 of the third detection signal SIG3 between the timings T11 and T12. Similarly, FIG. 6 also exemplifies a case where a criterion is set by the comparison signal SIG6 that there is a timing of a rising edge T16 of the fourth detection signal SIG4 between the timings T14 and T15.

As shown in FIG. 6, there is not the timing T13 in the criterion, i.e. between the timings T11 and T12, but the timing T13 is delayed from the criterion. The apparatus state determination unit 1F47 in FIG. 3, for example, measures a delay amount from the timing T11 to the timing T13.

The signal generation unit 1F45 in FIG. 3 generates a substitute signal SIG5 for the third detection signal SIG3 which is delayed. As explained in the first embodiment, by using the substitute signal SIG5, the image forming apparatus 1 can convey the recording medium 1H12 also to the location of the paper ejection sensor 1H20 and further.

In the second embodiment, in the case of using the substitute signal SIG5, the apparatus state determination unit 1F47 in FIG. 3 measures the timing T16 of the rising edge of the fourth detection signal SIG4.

In FIG. 6, since the timing T16 is detected between the timings T14 and T15, it is determined to be in a state where there is not a delay, i.e. a "normal" state.

In the case shown by FIG. 6, the timing T13 is delayed but the timing T16 is not delayed (a "normal" state). FIG. 6 exemplifies the case where it is determined that an output abnormality occurs in the third detection signal.

In the case where the timing T13 is delayed, a member of a mechanism at the location where the fixing sensor 1H25 is placed, i.e. a detection mechanism for the fixing device 1H19, may be abraded. The detection mechanism for the fixing device 1H19 is, for example, a so-called "filler mechanism". In the following, the filler mechanism will be explained.

The filler mechanism is a mechanism for detecting a recording medium such as a conveyed paper.

The filler mechanism includes a sensor. The filler mechanism is placed at a position where the filler mechanism contacts with the conveyed recording medium. When the recording medium is conveyed, the filler mechanism rotates according to a contact with the recording medium. A sensor of the filler mechanism detects a rotation of the filler mechanism. The filler mechanism generates various detection signals based on the detection of the rotation of the filler mechanism, and outputs them.

For example, in the case where the filler mechanism is worn out due to an aging deterioration or the like, even when the conveyed recording medium contacts with the filler mechanism, the filler mechanism may not rotate or the rotation is delayed due to the deterioration. That is, according to the delayed rotation of the filler mechanism due to the deterioration, a delay may occur with the detection.

Accordingly, by measuring delay amounts of the third detection signal SIG3 and of the fourth detection signal SIG4, a state of the mechanism for the fixing device 1H19 can be determined.

FIG. 7 is a timing chart for explaining an example of determination for the conveyance mechanism based on the delay amount according to the second embodiment.

In the case of measuring delay amounts, as in FIG. 6, when a delay for the timing T13 of the third detection signal is found, the image forming apparatus 1 uses the substitute signal SIG5. Furthermore, when the fourth detection signal SIG4 is determined to be delayed in measuring the timing T16, the apparatus state determination unit 1F47 in FIG. 3 determines that there is a "failure" for the conveyance mechanism between the registration sensor 1H23 and the fixing sensor 1H25. The "failure" for the conveyance mechanism occurs due to, for example, an aging deterioration, an abrasion or the like of the motor used for conveyance. For example, when a pressure for retaining a recording medium decreases due to the abrasion of rollers or the like, the conveyed recording medium may slip and a delay may occur.

Accordingly, by measuring the delay amounts of the third detection signal SIG3 and the fourth detection signal SIG4, a state of the conveyance mechanism of the image forming apparatus 1 can be determined.

In the case where there is a "failure" in the conveyance mechanism, the mechanism, in which a delay occurs, can convey a recording medium without delay by advancing the start time for conveyance by the measured delay amount. For example, the conveyance of the recording medium without delay can be performed by the signal generation unit 1F45 in FIG. 3 generating a substitute signal which is advanced by the measured delay amount.

FIG. 8 is a table for explaining an example of a result of determination according to the first and second embodiments.

The determination result table 2 illustrates an example of results of determination based on the respective detection signals and delays of the respective detection signals.

In the case where it is determined that detection signals for any of the first to fourth detection signals SIG1 to SIG4 can be detected and none of the detection signals are delayed, the apparatus state determination unit 1F47 in FIG. 3 determines that the image forming apparatus 1 is in the "normal" state. The "normal" state is a state where, for example, the respective sensors detect a recording medium and mechanisms for conveyance operate or the like to convey the recording medium without slippage or the like.

In the case where it is determined that any one of the first to fourth detection signals SIG1 to SIG4 is delayed, the signal generation unit 1F45 in FIG. 3 generates a substitute signal for the detection signal which is determined to be delayed. The apparatus state determination unit 1F47 in FIG. 3 measures a delay amount for a detection signal which is detected in the downstream side of the detection signal for which the substitute signal is generated. In the example illustrated in FIG. 8, in the case where it is determined that the third detection signal is delayed, the signal generation unit 1F45 in FIG. 3 generates a substitute signal for the third detection signal SIG3, and the apparatus state determination unit 1F47 in FIG. 3 measures a delay amount for the fourth detection signal SIG4.

When it is determined that the fourth detection signal SIG4 is not delayed (the fourth detection signal is asserted within a predetermined time interval defined by the timings T14 and T15), the apparatus state determination unit 1F47 in FIG. 3 determines that the apparatus is in a state where an aging deterioration or the like occurs in the detection mechanism.

When it is determined that the fourth detection signal SIG4 is delayed (the fourth detection signal is asserted after the predetermined time interval, but the delay amount is less than a predetermined time length), the apparatus state determination unit 1F47 in FIG. 3 determines that the apparatus is in a state where an aging deterioration or the like occurs in the conveyance mechanism.

When it is determined that the third detection signal SIG3 and the fourth detection signal SIG4 are not detected ("not detected" in FIG. 8), i.e. the third detection signal is not asserted before the delay amount reaches the predetermined time length and the fourth detection signal is not asserted before the delay amount reaches the predetermined time length, the apparatus state determination unit 1F47 in FIG. 3 determines that a jam, a warpage due to a change in temperature or the like occurs in the conveyance path. In the case of the warpage due to a change in temperature, when the temperature becomes a predetermined temperature, the apparatus state determination unit 1F47 in FIG. 3 may determine that the apparatus is in the "normal" state. Meanwhile, the detection signal may not be detected in the case where the detection unit is in the failure state. However, a probability that both the third detection unit and the fourth detection unit are in the failure state is considered to be extremely low.

<Image Formation Restriction Processing>

The image forming apparatus 1 may perform processing for restricting image formation (hereinafter, referred to as image formation restriction processing) in the case of using a substitute signal.

The image formation restriction processing is processing for restricting processing for image formation, e.g. stopping operations of the devices for the respective processes of transferring, fixing, image processing and the like.

The image forming apparatus 1 uses a substitute signal in the case of conveying a recording medium in order to perform determination of "failure" for the respective sensors. That is, since in the determination of "failure" an image is not formed on the recording medium, the image forming apparatus 1 stops the operations of the devices for the respective processes according to the image formation restriction process, and conveys the recording medium. Since the image forming apparatus 1 does not use electricity of high voltage by stopping the device, the apparatus can be in a safe state. Since the image forming apparatus 1 does not use a consumable supply such as toner by stopping the device, consumption of the consumable supply becomes lower. Since the image forming apparatus 1 can reduce power consumption for the devices by stopping the devices, the power consumption for the apparatus can be reduced. The device to be stopped includes, for example, the developing device 1H19 for stopping the fixing process, the ASIC 1D4 for stopping the image formation process of generating image data or the like, or the motor (not shown) of the transfer belt drive roller 1H4 for stopping the image formation process of the primary transfer or the like. The device to be stopped is preferably a device that greatly reduces power consumption by stopping the device, such as the device for fixing or for forming images. Moreover, the device to be stopped is preferably a device, which reduces a risk of fire, a burn or the like due to heating by stopping the device, such as the device for fixing or for forming images.

Since the image forming apparatus 1 according to the present invention can convey a recording medium by generating a substitute signal even if the sensor is in a state of "failure" and perform image formation, the reliability of the image forming apparatus 1 is enhanced. Moreover, when the sensor is in the state of "failure", the image forming apparatus 1 can identify a location of the sensor which is in the state of "failure", by generating the substitute signal. Furthermore, when a jam or the like occurs in the image forming apparatus 1, the image forming apparatus 1 can be identified to be in the jam state by generating the substitute signal. Accordingly, by generating the substitute signal, the state of the image forming apparatus 1 can be easily identified.

Meanwhile, in the above-described embodiments, a program for performing the respective processes may be installed in the image forming apparatus and cause the image forming apparatus to perform the respective processes.

Further, the present invention is not limited to these embodiments, but various variations and modifications may be made without departing from the scope of the present invention.

The present application is based on and claims the benefit of priority of Japanese Priority Application No. 2014-035908 filed on Feb. 26, 2014, the entire contents of which are hereby incorporated by reference.

What is claimed is:

1. An image forming apparatus comprising:
   a detector configured to,
      output a first detection signal upon detecting a recording medium,
      output a second detection signal upon detecting the recording medium being conveyed to a registration roller; and
   a processor configured to
      generate a substitute signal for the first detection signal when the detector does not output the first detection signal,
      determine a state of the image forming apparatus based on the first detection signal and the second detection signal,
      determine whether the first detection signal is output during or before a first time period elapses from a first reference time,
      determine whether the second detection signal is output during or before a second time period elapses from a second reference time, and
      determine that the detector is in a failure state upon receiving the second detection signal and the substitute signal,
   wherein the processor is configured to generate the substitute signal for the first detection signal when the detector does not output the first detection signal during or before the first time period elapses from the first reference time.

2. The image forming apparatus of claim 1, further comprising:
   a conveyor configured to convey the recording medium, wherein,
      the processor is configured to determine that the conveyor is in a failure state when the processor receives the substitute signal and the second detection signal, and
      the detector is configured to output the second detection signal after the second time period is elapsed from the second reference time.

3. The image forming apparatus of claim 1, wherein the processor is configured to determine that a failure occurs in a conveyance path when the first detection signal is not output and the second detection signal is not output, the conveyance path configured to convey the recording medium.

4. The image forming apparatus of claim 3, wherein the processor is configured to restrict the conveyance of the recording medium if the failure in the conveyance path occurs.

5. The image forming apparatus of claim 1, wherein the processor is configured to restrict a formation of an image on the recording medium if the substitute signal is generated.

6. The image forming apparatus of claim 5, further comprising:
   a fixing unit configured to fix the image on the recording medium; and
   an image former configured to form the image, wherein
      the processor is configured to restrict the formation of the image on the recording medium by restricting operation of at least one of (i) the fixing unit and (ii) the image former.

7. The image forming apparatus of claim 1, wherein the processor is configured to form an image on the recording medium using the substitute signal if the detector is in the failure state.

8. A non-transitory computer-readable medium having computer readable instructions stored thereon, when executed by at least one processor, configured to instruct the at least one processor to:
   output a first detection signal upon detecting a recording medium;
   generate a substitute signal for the first detection signal when the first detection signal is not output;
   output a second detection signal upon detecting the recording medium being conveyed to a registration roller;
      determine a state of an image forming apparatus based on the first detection signal and the second detection signal,
      determine whether the first detection signal is output during or before a first time period elapses from a first reference time,
      determine whether the second detection signal is output during or before a second time period elapses from a second reference time, and
      determine a failure state when the second detection signal and the substitute signal is input,
   wherein the processor is further configured to generate the substitute signal for the first detection signal when the first detection signal is not output during or before the first time period elapses from the first reference time.

9. The image forming apparatus of claim 1, wherein the processor is configured to determine where the recording medium is stopped based upon the substitute signal.

10. The non-transitory computer-readable recording medium of claim 8, wherein the processor is configured to determine where the recording medium is stopped based upon the substitute signal.

* * * * *